US006658749B2

(12) United States Patent
Jackson et al.

(10) Patent No.: US 6,658,749 B2
(45) Date of Patent: Dec. 9, 2003

(54) 3D MACHINE VISION MEASURING SYSTEM WITH VEHICLE POSITION ADJUSTMENT MECHANISM FOR POSITIONING VEHICLE

(75) Inventors: David A. Jackson, Point Roberts, WA (US); Gordon F. Schmeisser, Santa Cruz, CA (US)

(73) Assignee: Snap-On Technologies, Inc., Lincolnshire, IL (US)

( * ) Notice: Subject to any disclaimer, the term of this patent is extended or adjusted under 35 U.S.C. 154(b) by 4 days.

(21) Appl. No.: 09/853,654

(22) Filed: May 14, 2001

(65) Prior Publication Data

US 2002/0144414 A1 Oct. 10, 2002

Related U.S. Application Data

(60) Provisional application No. 60/214,390, filed on Jun. 28, 2000.

(51) Int. Cl.[7] .................................................. G01B 7/30
(52) U.S. Cl. ..................... 33/203.12; 33/288; 33/203
(58) Field of Search ..................... 33/286, 288, 600, 33/203, 203.12, 203.13, 203.15, 203.14

(56) References Cited

U.S. PATENT DOCUMENTS

| | | | | |
|---|---|---|---|---|
| 1,850,065 A | * | 3/1932 | Sawlsville | 105/26.1 |
| 1,886,588 A | * | 11/1932 | Riblet | 105/26.1 |
| 3,473,374 A | * | 10/1969 | Leeper | 33/203.13 |
| 3,566,476 A | * | 3/1971 | McWhorter | 33/288 |
| 3,643,337 A | * | 2/1972 | Dick | 33/203.13 |
| 3,822,430 A | * | 7/1974 | Larson | 15/53.1 |
| 3,844,222 A | * | 10/1974 | Eller | 104/172.3 |
| 4,249,824 A | | 2/1981 | Wiederrich et al. | |
| 4,311,386 A | | 1/1982 | Coetsier | |
| 4,589,509 A | * | 5/1986 | Chase | 180/74 |
| 4,643,578 A | | 2/1987 | Stern | |
| 4,679,327 A | * | 7/1987 | Fouchey et al. | 33/203.13 |
| 4,945,645 A | * | 8/1990 | Brugelmeir | 33/203.14 |
| 5,001,988 A | * | 3/1991 | Agathos | 104/172.3 |
| 5,014,227 A | | 5/1991 | Kling et al. | |
| 5,024,001 A | | 6/1991 | Borner et al. | 33/203.18 |
| 5,165,177 A | | 11/1992 | Kercheck | |
| 5,207,002 A | * | 5/1993 | Humblet | 33/288 |

(List continued on next page.)

FOREIGN PATENT DOCUMENTS

| | | | |
|---|---|---|---|
| DE | 19730524 C1 | 12/1998 | |
| FR | 0757231 | 2/1997 | |
| GB | 22258315 A | 2/1993 | |
| GB | 2 283 090 | 4/1995 | |
| JP | 56111401 | * 9/1981 | 33/286 |
| JP | 60202305 | * 10/1985 | 33/203 |
| WO | WO9307443 | 4/1993 | |
| WO | WO9848241 | 10/1998 | |
| WO | WO99/03018 | 1/1999 | |

OTHER PUBLICATIONS

Hunter Engineering Company "Mercedes–Benz Wheel Alignment System" Operation Instructions, Hunter Engineering Co. Form No. 4292T, Nov., 1998, 44 pps.

Primary Examiner—Christopher W. Fulton
Assistant Examiner—Travis Reis
(74) Attorney, Agent, or Firm—McDermott, Will & Emery (57) ABSTRACT

A system for obtaining positional information about a vehicle includes a vision imaging system and a vehicle position adjustment mechanism for moving the vehicle between at least two positions for detection by the vision imaging system. The vehicle position adjustment mechanism includes a body, surface support wheels, a motor, and a controller. The body engages the vehicle, and the controller controls the direction and distance the vehicle position adjustment mechanism moves the vehicle. The surface support wheels are connected to the body and support the body on a surface. The motor drives the vehicle between the at least two positions.

30 Claims, 4 Drawing Sheets

U.S. PATENT DOCUMENTS

| | | |
|---|---|---|
| 5,208,646 A | 5/1993 | Rogers et al. |
| 5,341,575 A * | 8/1994 | Chisum ........................ 33/608 |
| 5,519,488 A | 5/1996 | Dale, Jr. et al. |
| 5,535,522 A | 7/1996 | Jackson ........................ 33/288 |
| 5,553,389 A | 9/1996 | Winslow et al. |
| 5,586,062 A | 12/1996 | Colarelli, III |
| 5,675,515 A | 10/1997 | January |
| 5,724,128 A | 3/1998 | January |
| 5,724,743 A | 3/1998 | Jackson ........................ 33/288 |
| 5,748,301 A | 5/1998 | Muller et al. |
| 5,812,256 A | 9/1998 | Chapin et al. |
| 5,832,617 A | 11/1998 | Gill |
| 5,875,418 A | 2/1999 | Gill et al. |
| 5,943,783 A | 8/1999 | Jackson |
| 6,070,332 A | 6/2000 | Kane |

\* cited by examiner

3D MACHINE VISION MEASURING SYSTEM WITH VEHICLE POSITION ADJUSTMENT MECHANISM FOR POSITIONING VEHICLE

CROSS REFERENCE TO RELATED APPLICATIONS

This application claims the benefit of U.S. Provisional Application No. 60/214,390, filed on Jun. 28, 2000, incorporated herein by reference.

FIELD OF THE INVENTION

The present invention relates generally to motor vehicle wheel alignment and, more specifically, to providing a vehicle position adjustment mechanism for positioning a vehicle in different positions for applications such as using a 3D machine vision measuring system for alignment.

BACKGROUND OF THE INVENTION

Motor vehicle alignment systems are important for ensuring that the alignments of wheels on a vehicle are within the specifications provided by motor vehicle manufacturers. If the wheels are out of alignment, there may be excessive or uneven wear. In addition, the performance of the vehicle, particularly handling and stability, may be adversely affected if the wheels are not properly aligned. As used herein, the term "wheel" or "vehicle wheel" refers to the tire and wheel assembly found on a motor vehicle. Such an assembly generally includes a conventional tire that is mounted on a metal wheel or "rim."

The wheels of a motor vehicle may be aligned in a number of ways. For example, an operator or an alignment technician can use a vision imaging system such as a computer-aided, three-dimensional (3D) machine vision that employs optical sensing devices, such as cameras, to determine the positions of various objects. Although such machine vision systems are typically used for alignment purposes, these systems can also be used to obtain other positional and angular orientation information about a motor vehicle. Examples of such apparatus and methods are disclosed in U.S. Pat. No. 5,724,743, entitled "Method and Apparatus for Determining the Alignment of Motor Vehicle Wheels," issued to Jackson, et al. on Mar. 10, 1998 and in U.S. Pat. No. 5,535,522, entitled "Method and Apparatus for Determining the Alignment of Motor Vehicle Wheels," issued to Jackson, et al. on Jul. 16, 1996, each incorporated herein by reference. The apparatus disclosed in these patents is sometimes called a "3D aligner" or an "aligner," hereinafter referred to as a vision imaging system. As used herein, the term "position determination system" refers to an alignment system, such as the vision imaging system, in addition to other components used in conjunction with the alignment system to obtain positional and angular orientation information about a motor vehicle.

Figure 1:
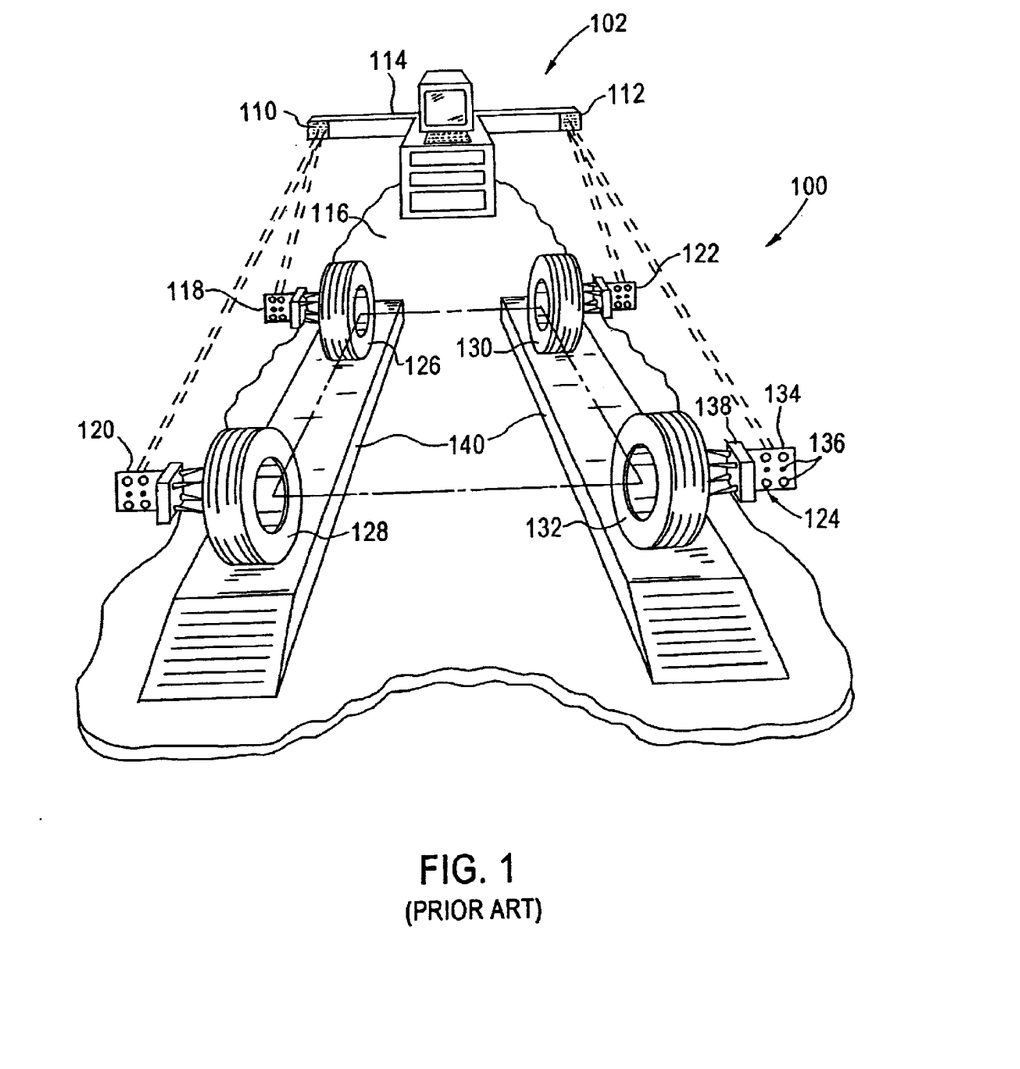
FIG. 1 is a perspective view of a position determination system.

An example of a position determination system is illustrated in FIG. 1. The position determination system 100 includes a vision imaging system 102 having a pair of fixed, spaced-apart cameras 110, 112 mounted on a beam 114. The beam 114 has a length sufficient to position the cameras 110, 112 respectively outboard of the sides of any vehicle to be aligned by the position determination system 100. Also, the beam 114 positions the cameras 110, 112 high enough above the shop floor 116 to ensure that the two targets 118, 120 on the left side of the vehicle are both within the field of view of the left side camera 110, and two targets 122, 124 on the right side of the vehicle are both within the field of view of the right side camera 112.

Targets 118, 120, 122, 124 are mounted on each of the wheels 126, 128, 130, 132 of the motor vehicle, with each target 118, 120, 120, 124 including a target body 134, target elements 136, and an attachment apparatus 138. The attachment apparatus 138 attaches the target 118, 120, 120, 124 to wheel 126, 128, 130, 132. An example of an attachment apparatus is described in U.S. Pat. No. 5,024,001, entitled "Wheel Alignment Rim Clamp Claw" issued to Borner et al. on Jun. 18, 1991, incorporated herein by reference. The target elements 136 are positioned on the target body 134. Examples of target bodies 134 and target elements 112 acceptable for use in the invention are described in U.S. Pat. No. 5,724,743.

In operation, once the position determination system 100 has been calibrated using a calibration target (not shown), as described in the incorporated references, a vehicle can be driven onto the rack 133, and, if desired, the vehicle lifted to an appropriate repair elevation. The targets 118, 120, 122, 124, once attached to the wheel rims, are then oriented so that the target elements 136 on the target body 134 face the respective camera 110, 112. The vehicle and model year can then entered into the vision imaging system 102 along with other identifying parameters, such as vehicle VIN number, license number, owner name, etc.

The location of the targets 118, 120, 122, 124 relative to the rim of the wheels 126, 128, 130, 132 to which the targets are attached are typically known to an accuracy of about 0.01" and about 0.01°. Once the targets 118, 120, 122, 124 have been imaged in one position, the wheels 126, 128, 130, 132 are rolled to another position and a new image can be taken. Using the imaged location of the targets 118, 120, 122, 124 in the two positions, the actual position and orientation of the wheels 126, 128, 130, 132 and wheel axis can be calculated by the vision imaging system 102. Although the distance between the two positions varies, the distance is often approximately 8 inches.

A problem associated with moving the vehicle to the different positions during use of the position determination system is that the vehicle must be manually pushed from one position to next position. This pushing of the vehicle takes considerable strength. If, for example, the car is particularly heavy or the technician pushing the car has insufficient strength, the technician may be unable to roll or safely roll the vehicle between the two positions. There is, therefore, a need for an apparatus for positioning the vehicle to be measured by the position determination system that does not require a particular level of strength in the technician doing the measurements. Furthermore, there is a need for an apparatus that accurately rolls the vehicle into the positions in which images of the targets are taken. This need arises as well for non-vision type alignment and other applications requiring a vehicle to be rolled for relatively short distances.

SUMMARY OF THE INVENTION

This and other needs are met by the present invention, which in accord with one aspect includes a position determination system and a vehicle position adjustment mechanism. The position determination system obtains positional information about a vehicle and can include a vision imaging system and the vehicle position adjustment mechanism. The vehicle position adjustment mechanism moves the vehicle into at least two positions for imaging by the vision imaging system. The vehicle position adjustment mechanism includes a body for engaging the vehicle and a controller to control the direction and distance the vehicle position adjustment mechanism moves the vehicle. The controller can communicate with the vision imaging system. Also, the vehicle position adjustment mechanism can further include surface support wheels connected to the body for supporting the body on a surface and a motor for driving the vehicle into the at least two positions.

By providing a vehicle position adjustment mechanism that moves a vehicle into at least two position for imaging by a vision imaging system, a technician operating the position determination system can position the vehicle without the need for excess physical exertion. Additionally, the operator can control the movement of the vehicle within a positional tolerance acceptable for the vision imaging system through use of the controller. A typical movement of the vehicle is 8 inches back from an initial starting point and then 8 inches forward to the initial starting point.

The vehicle position adjustment mechanism can include surface support wheels that are connected to the body for supporting the body on a surface. Vehicle support wheels for engaging the vehicle wheel can also be provided. Also, the vehicle position adjustment mechanism can include a motor driving at least one of the vehicle support wheels and the surface support wheels to drive the vehicle into the at least two positions.

The body surrounds and engages a vehicle wheel of the vehicle, and includes a cavity into which the vehicle wheel is inserted for engagement. The body can also include an open end through which the vehicle tire can be inserted into the cavity. The body can also include such features as joints for allowing the body to be separated and a width adjuster to adjust the width of the cavity.

In an alternative aspect, the body includes an engaging arm for engaging the vehicle with the engaging arm extending from the base. The engaging arm can also include an attachment device to connect the engaging arm to the vehicle.

In still another alternative aspect, the body includes an engagement device for engaging the vehicle, an attachment device for attaching the body to rails on a rack, and a motor for driving the attachment device along the rails. The rack, for example, can be an alignment rack, and the engagement device, for example, can be an air bladder. Also, the attachment device can be a rack and pinion system.

Additional advantages of the present invention will become readily apparent to those skilled in this art from the following detailed description, wherein only an exemplary embodiment of the present invention is shown and described, simply by way of illustration of the best mode contemplated for carrying out the present invention. As will be realized, the present invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent like elements throughout, and wherein.

DETAILED DESCRIPTION OF THE PREFERRED EMBODIMENTS

The present invention addresses and solves the problem of moving a vehicle into at least two positions for a position determination system without requiring a technician to possess a particular level of strength. This is achieved, in part, by providing a vehicle position adjustment mechanism for moving the vehicle between at least two positions that ordinarily are positions on a rack, as shown. A position determination system 100 and a vision imaging system 102 with which the vehicle position adjustment mechanism is implemented are best shown in FIG. 1 and have been described previously. The vehicle position adjustment mechanism 200, shown in FIGS. 2 and 3, operates to move the vehicle 212 into at least two positions, at which vision imaging system of the position determination system images the targets 214. A typical movement of the vehicle 212 is about 8 inches back and about 8 inches forward. The vehicle position adjustment mechanism 200 advantageously allows a technician to move the vehicle 212 without requiring the technician to use excessive physical effort in doing so. The vehicle position adjustment mechanism 200 includes a body 220, adjuster wheels 222, 224, and a motor 226. The body 220 supports the adjuster wheels 222, 224 and also the motor 226.

Figure 2:
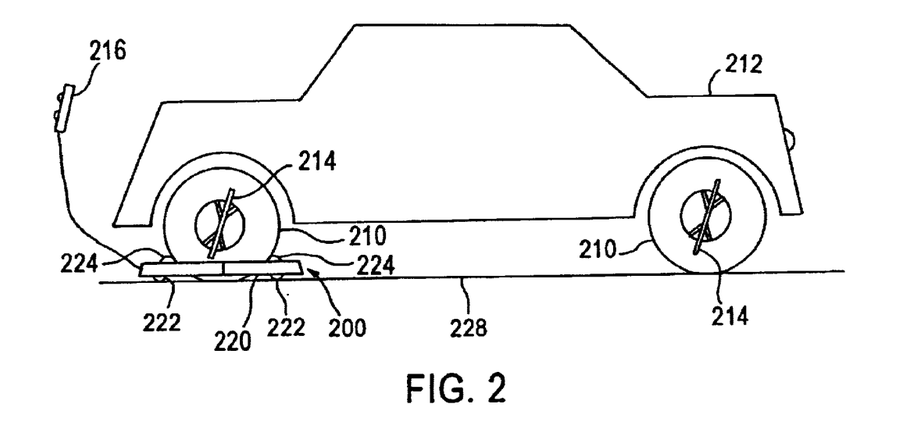
FIG. 2 is a side view of a vehicle position adjustment mechanism positioned on a vehicle.
Figure 3:
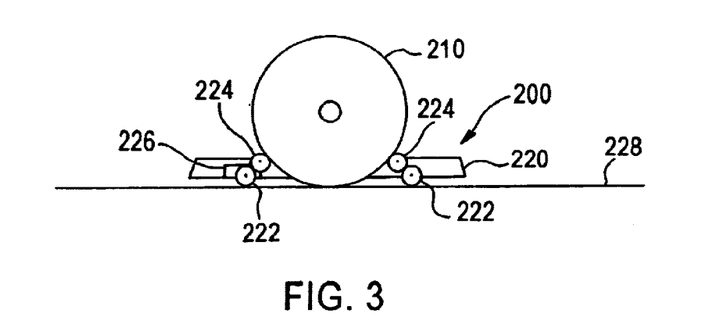
FIG. 3 is a sectional side view of the vehicle position adjustment mechanism in FIG. 2.

The adjuster wheels can include surface support wheels 222 for rolling the vehicle position adjustment mechanism 200 over a surface 228 and also vehicle support wheels 224 for engaging the vehicle wheel 210 of the vehicle 212. Although the surface support wheels 222 and the vehicle support wheels 224 can be combined into one set of adjuster wheels, in a current aspect of the vehicle position adjustment mechanism 200, separate adjuster wheel sets are used respectively for the surface support wheels 222 and the vehicle support wheels 224. Although not necessary, the surface support wheels 222 can engage with the vehicle support wheels 224 whereby the rotation of one wheel of the sets of adjuster wheels 222, 224 advantageously rotates the wheel of the other set.

The motor 226 drives at least one of the sets of adjuster wheels 222, 224. In this manner, the vehicle 212 can be moved from one position to another position. If, for example, the motor 226 drives the vehicle support wheels 224, the engagement of the vehicle support wheels 224 to the vehicle wheel 210 imparts rotation to the vehicle wheel 210, and this rotation of the vehicle wheel 210 causes the vehicle 212 to move. Alternatively, if the motor 226 drives the surface support wheels 222, the surface support wheels 222 rotate relative to the surface 228 and this rotation causes movement of the vehicle position adjustment mechanism 200, and thus, movement of the vehicle tire 210. If the surface support wheels 222 are engaged with the vehicle support wheels 224, rotation of either set of wheels 222, 224 by the motor 226 directly causes both rotation of the vehicle wheel 210 by the vehicle support wheels 224 and motion of the surface support wheels 222 relative to the surface 228.

The vehicle position adjustment mechanism 200 can also include a controller 216 to control both the direction and distance the vehicle position adjustment mechanism 200 moves the vehicle 212. The controller 216 can also direct the vehicle position adjustment mechanism 200 to move the vehicle 212 to each of the positions in which the vision imaging system images the targets 214 to within an acceptable positional tolerance specified by the vision imaging system. The controller 216 is connected to the motor 226, and this connection can be any type of connection that allows information to be transferred back and forth. For example, the connection can be a physical wired connection, as illustrated, or the connection can be wireless, such as infrared.

Although the controller 216, as shown, is separate from the vision imaging system of the position determination system, the controller 216 can also be incorporated within the vision imaging system of the position determination system whereby the vision imaging system controls the functions of the controller 216. The controller 216 can also communicate with the vision imaging system of the position determination system that the vehicle has reached a particular position in which the targets 214 are to be imaged and direct the vision imaging system to initiate an imaging of the targets 214. Controllers 216 capable of providing the foregoing features are known to those skilled in the art, and the vehicle position adjustment mechanism 200 is not limited as to a particular type of controller 216.

Figure 4:
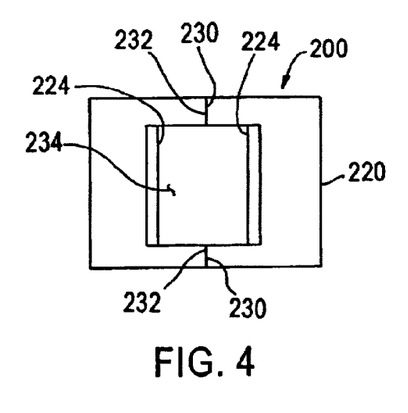
FIG. 4 is a top plan view of a vehicle position adjustment mechanism.

The body 220 of the vehicle position adjustment mechanism 200 can be positioned to surround and engage the vehicle wheel 210, and any modification to the vehicle position adjustment mechanism 200 to make the body 220 so capable is acceptable. For example, as illustrated in FIG. 4, the body 220 can include a cavity 234 into which the vehicle wheel 210 is inserted. The body 220 can include joints 230 that allow for partial or complete separation of the body 220 to facilitate insertion of the vehicle wheel 210 into the cavity 234. In operation, the body 220 is separated along the joint or joints 230 and then positioned to engage the vehicle wheel 210. After the vehicle wheel 210 has been engaged by the vehicle support wheels 224, the body 220 is reattached along the joint or joints 230.

Figure 5:
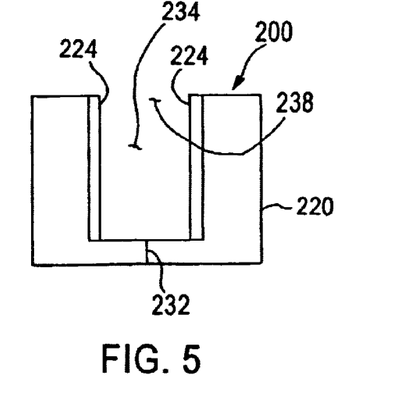
FIG. 5 is a top plan view of an alternative vehicle position adjustment mechanism.

In another example illustrated in FIG. 5, the body 220 can include an open end 238. In operation, the wheel 210 is passed through the open end 238 of the body 220 and then positioned to be engaged by the vehicle support wheels 224. The body 220 can also include a width adjuster 232. The width adjuster 232 enables the distance between the vehicle support wheels 224 to be increased or decreased thereby adapting the vehicle position adjustment mechanism 200 to different sizes of wheel 210. Width adjusters 232 capable of executing the foregoing are mechanisms commonly known by those skilled in the art, and the vehicle position adjustment mechanism 200 implemented herein is not limited to any particular type.

Figure 6:
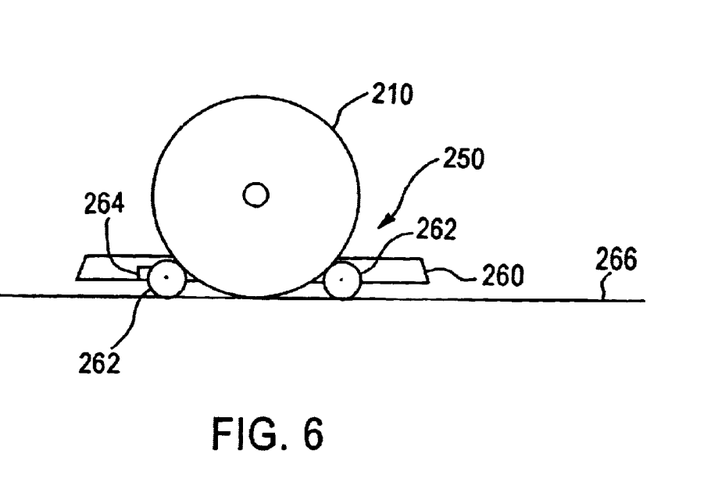
FIG. 6 is a sectional side view of an alternative vehicle position adjustment mechanism.

An alternative vehicle position adjustment mechanism is illustrated in FIG. 6. The vehicle position adjustment mechanism 250 is similar to the previously discussed vehicle position adjustment mechanism 200 by including a body 260, adjuster wheels 262 and a motor 264. The body 260 supports the adjuster wheels 262 and also the motor 264. The motor 264 drives at least one of the adjuster wheels 262, and in this manner, the vehicle wheel 202 can be moved from one position to another position.

If the vehicle wheel 210 engages the wheels 262 of the vehicle position adjustment mechanism 250, the wheels 262 can be formed from a material that has a higher coefficient of friction with the surface 266, upon which the adjuster wheels 262 contact, than the coefficient of friction between the adjuster wheels 262 and the vehicle wheel 210. In this manner, engagement of the adjuster wheel 262 of the vehicle position adjustment mechanism 260 produces less friction, which allows the adjuster wheel 262 and the vehicle wheel 210 to slide relative to one another. The vehicle position adjustment mechanism 250 can also include a controller 216 (best illustrated in FIG. 2), which has been previously discussed with regard to the first vehicle position adjustment mechanism 200.

In operation, the vehicle position adjustment mechanisms 200, 250 can be placed along any one of the vehicle wheels 210. Alternatively, the vehicle position adjustment mechanisms 200, 250 can be placed along two or more of the vehicle wheels 210. Although the placement of vehicle position adjustment mechanisms 200, 250 is not limited as to a particular vehicle wheel 210, by placing the vehicle position adjustment mechanism 200, 250 on a rear vehicle wheel 210, the front vehicle wheels can be advantageously turned without interference from the vehicle position adjustment mechanism 200, 250.

Figure 7:
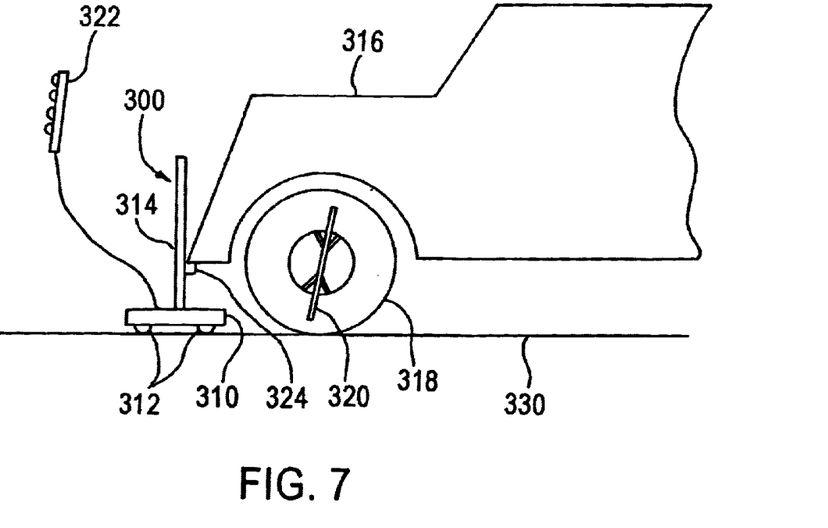
FIG. 7 is a side view of another alternative vehicle position adjustment mechanism.

An additional alternative vehicle position adjustment mechanism 300 is illustrated in FIG. 7. The vehicle position adjustment mechanism 300 includes a base 310, support 314, surface support wheels 312, and an engaging arm 324. The base 310 is supported on a surface 330 by the surface support wheels 312, and the support 314 extends from the base 310. The engaging arm 324 is channeled in the support 314 in the manner of a jack to enable the engaging arm 324 to move vertically within the support 314. The vehicle position adjustment mechanism 300 can also include a motor (not shown) for driving the surface support wheels 312. In this manner, the vehicle 316 can be moved to the desired positions for the vision imaging system to image the targets 320 on the vehicle wheels 318. The vehicle position adjustment mechanism 300 can also include a controller 322 for controlling the movement of the vehicle position adjustment mechanism 300 and the engaging arm 324. A controller 322 suitable for use with this vehicle position adjustment mechanism 300 has been previously discussed with regard to the first vehicle position adjustment mechanism 200.

The engaging arm 324, which connects to the vehicle 316, is not limited as to where on the vehicle 316 the engaging arm 324 is attached. The engaging arm 324 can be moved relative to the support 314 by a motor (not shown), and moving the engaging arm 324 relative to the support 314 acts to engage the vehicle 316, which allows the vehicle position adjustment mechanism 300 to more easily move the vehicle 316.

Figure 8:
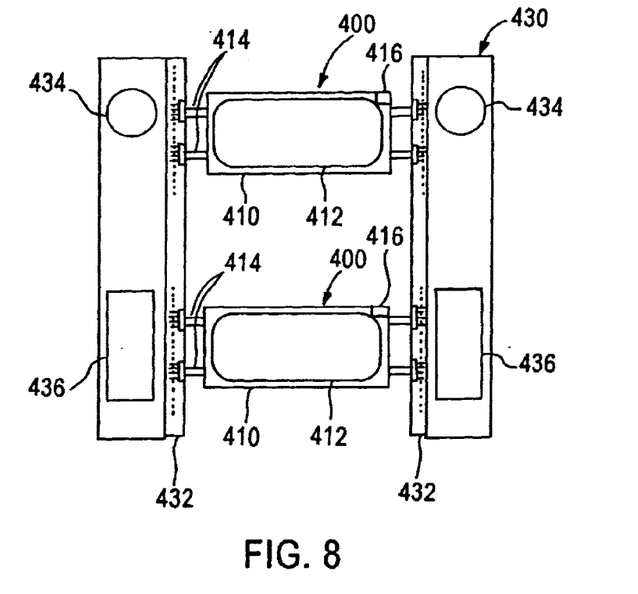
FIG. 8 is a top plan view of still another alternative vehicle position adjustment mechanism.
Figure 9:
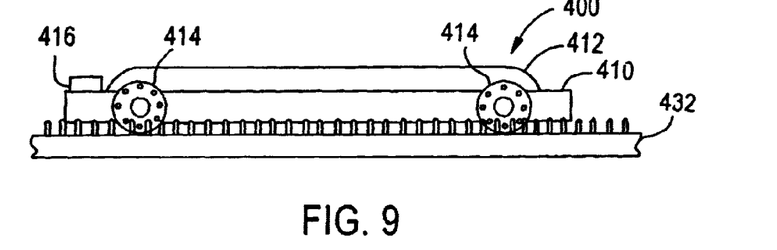
FIG. 9 is a side view of the vehicle position adjustment mechanism in FIG. 8.

A further alternative vehicle position adjustment mechanism is illustrated in FIGS. 8 and 9. The vehicle position adjustment mechanism 400 includes a body 410 supporting an engagement device 412 and movable connectors 414. The movable connectors 414 connect the body 410 to rails 432 and allows the body to be moved relative to the rails 432. In operation, the engagement device 412 is positioned underneath a vehicle (not shown), and then the engagement device 412 raises to engage the vehicle. The vehicle position adjustment mechanism 400 is then able to be moved back and forth along the rails 432 to position the vehicle into the at least two positions for imaging by the vision imaging system.

Although the vehicle position adjustment mechanism 400 is not limited in this manner, the rails 432 to which the vehicle position adjustment mechanism 400 moves along can be connected to an alignment rack 430. Alignment racks 430 are well known by those skilled in the art and commonly include turntables 434 and skid plates 436. Although one vehicle position adjustment mechanism 400 can be used for a rack 430, in one aspect, two or more vehicle position adjustment mechanisms 400 are used to engage the vehicle.

Engagement devices 412 capable of engaging a vehicle are well known by those skilled in the art, and the vehicle position adjustment mechanism 400 is not limited as to a particular type of engagement device 412. For example, the engagement device 412 can be in the form of an air bladder, which upon expansion engages the vehicle. An alternative example of an engagement device 412 engages the vehicle using hydraulics. During engagement, the engagement device 412 engages the vehicle so as to be able to apply a force to move the vehicle horizontally.

Figure 10A:
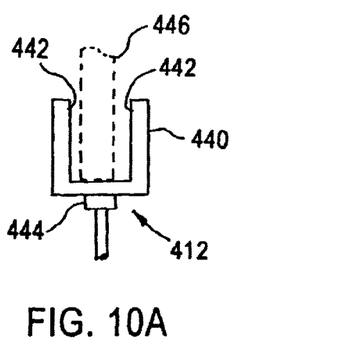
FIGS. 10A and 10B are partial side views of alternative engagement devices for the vehicle position adjustment mechanism in FIG. 8.
Figure 10B:
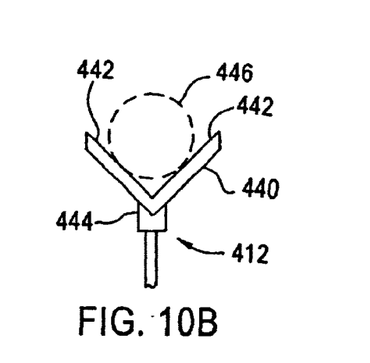

In one aspect, the engagement device 412 advantageously does not raise the vehicle, as raising the vehicle would change the alignment characteristics of the vehicle when the targets 214 are imaged by the vision imaging system. In exemplary aspects, as illustrated in FIGS. 10A and 10B, the engagement device 412 can include a cradle 440 having, for example, a U-shape or V-shape. In so doing, the cradle 440 can engage a portion of the vehicle 446 and still be able to apply horizontal force with the inner sides 442 of the cradle 440 to move the vehicle 446 in a horizontal direction. Additionally, the cradle 440 can include a pressure transducer 444 that senses the pressure the engagement device 412 is exerting against the vehicle 446 and stops the upward pressure of the engagement device 412 before vehicle 446 is lifted upward.

The vehicle position adjustment mechanism 400 is not limited as to a particular type of connector 414, so long as the connector 414 connects the vehicle position adjustment mechanism 400 to the rail 432 and allows the vehicle position adjustment mechanism to move relative to the rail 432. Also, in one aspect, the connector 414 can include a motor (not shown) for controlling the movement of the vehicle position adjustment mechanism 400 relative the rails 432. An example of a connector 414 is a rack and pinion system, as shown. Another example of a connector 414 is a hydraulically operated slide (not shown).

The vehicle position adjustment mechanism 400 can also include a controller 416 to control both the direction and distance the vehicle position adjustment mechanism 400 moves the vehicle. The controller 416 can also direct the vehicle position adjustment mechanism 400 to move the vehicle to each of the positions in which the vision imaging system images the targets to within an acceptable positional tolerance specified by the vision imaging system. The controller 416 is connected to the connector 414, which is used to move the vehicle position adjustment mechanism 400 relative to the rails 432.

Although the controller 416, as shown, is separate from the vision imaging system, the controller 416 can also be incorporated within the vision imaging system of the position determination system. The controller 416 can also indicate to the vision imaging system that the vehicle has reached a particular position in which the targets are to be imaged and direct the vision imaging system to initiate an imaging of the targets. Controllers 416 capable of executing the foregoing are commonly known to those skilled in the art, and the vehicle position adjustment mechanism 400 is not limited as to a particular type of controller 416.

The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only an exemplary aspect of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A position determination system, comprising:
   a vision imaging system; and
   a vehicle position adjustment mechanism for moving the vehicle between at least two positions for detection by the vision imaging system, the vehicle position adjustment mechanism including:
      a body for engaging the vehicle, and
      a controller to control the direction and distance the vehicle position adjustment mechanism moves the vehicle.

2. The system according to claim 1, wherein the vehicle position adjustment mechanism further includes
   surface support wheels connected to the body for supporting the body on a surface,
   a motor for driving the vehicle into the at least two positions.

3. The system according to claim 2, wherein the vehicle adjustment mechanism is mounted to a rack.

4. The system according to claim 2, wherein the body surrounds and engages a vehicle wheel of the vehicle.

5. The system according to claim 4, wherein the body includes driving elements and a cavity into which the vehicle wheel is inserted for engagement with the driving elements.

6. The system according to claim 5, wherein the body includes an open end through which the vehicle tire can be inserted into the cavity.

7. The system according to claim 5, wherein the body includes joints allowing the body to be opened for access by the vehicle wheel.

8. The system according to claim 5, wherein the body includes a width adjuster to adjust the width of the cavity.

9. The system according to claim 5, wherein the driving elements includes vehicle support wheels for engaging the vehicle wheel.

10. The system according to claim 9, wherein the motor drives at least one of the vehicle support wheels and the surface support wheels.

11. The system according to claim 2, wherein the body further includes an engaging arm for engaging the vehicle.

12. The system according to claim 1, wherein the body further includes an engagement device for engaging the vehicle, an attachment device for attaching the body to rails on a rack, and a motor for driving the attachment device along the rails.

13. The system according to claim 12, wherein the engagement device is an air bladder.

14. The system according to claim 12, wherein the attachment device is a rack and pinion system.

15. The position determination system according to claim 1, wherein the vehicle position adjustment mechanism is configured to allow at least one wheel of the vehicle to rotate when the vehicle is moved between the at least two positions.

16. The position determination system according to claim 15, wherein movement of the vehicle between the at least two positions is in a substantially horizontal plane.

17. A vehicle position adjustment mechanism for moving a vehicle into at least two positions for imaging by a vision imaging system, comprising:

a body;

surface support wheels for supporting the body on a surface, the surface support wheels connected to the body;

vehicle support wheels for engaging the vehicle wheels, the vehicle support wheels connected to the body;

a motor driving at least one of the surface support wheels and the vehicle support wheels; and a controller connected to the motor to control the direction and distance the vehicle position adjustment mechanism moves the vehicle.

18. The vehicle position adjustment mechanism according to claim 17, wherein the body includes a cavity into which the vehicle wheel is inserted for engagement.

19. The vehicle position adjustment mechanism according to claim 18, wherein the body includes an open end through which a vehicle wheel can be inserted.

20. The vehicle position adjustment mechanism according to claim 18, wherein the body includes a width adjuster to adjust the width of the cavity.

21. The vehicle position adjustment mechanism according to claim 17, wherein the body includes joints allowing the body to be separated.

22. The vehicle position adjustment mechanism according to claim 17, wherein the at least two positions are less than 16 inches apart.

23. The vehicle position adjustment mechanism according to claim 17, wherein the vehicle position adjustment mechanism is configured to allow at least one wheel of the vehicle to rotate when the vehicle is moved between the at least two positions.

24. The vehicle position adjustment mechanism according to claim 23, wherein movement of the vehicle between the at least two positions is in a substantially horizontal plane.

25. A vehicle position adjustment mechanism for moving a vehicle between at least two positions for imaging a vision imaging system, comprising:

a body;

an engagement device for engaging the vehicle, the engagement device attached to the body;

an attachment device for the body to rails on a rack;

a motor for driving the attachment device along the rails;

a controller configured to be coupled to the vision imaging system for controlling the engagement device and the motor to control the direction and distance the vehicle position adjustment mechanism moves the vehicle for imaging by the vision imaging system.

26. The vehicle position adjustment mechanism according to claim 25, wherein the rack is an alignment rack.

27. The vehicle position adjustment mechanism according to claim 25, wherein the engagement device is an air bladder.

28. The vehicle position adjustment mechanism according to claim 25, wherein the attachment device is a rack and pinion system.

29. The vehicle position adjustment mechanism according to claim 25, wherein the vehicle position adjustment mechanism is configured to allow at least one wheel of the vehicle to rotate when the vehicle is moved between the at least two positions.

30. The vehicle position adjustment mechanism according to claim 29, wherein movement of the vehicle between at least two positions is in a substantially horizontal plane.

* * * * *